United States Patent [19]

Morishige

[11] Patent Number: 5,166,854
[45] Date of Patent: Nov. 24, 1992

[54] EXTERNALLY DISCERNIBLE POWER SUPPLY ABNORMALITY DETECTION SYSTEM

[75] Inventor: Toshiyuki Morishige, Kawasaki, Japan

[73] Assignee: Kabushiki Kaisha Toshiba, Kawasaki, Japan

[21] Appl. No.: 491,087

[22] Filed: Mar. 9, 1990

[30] Foreign Application Priority Data

Mar. 15, 1989 [JP] Japan .................................. 1-62990

[51] Int. Cl.⁵ .......................... H02H 3/04; H02H 3/20
[52] U.S. Cl. ....................................... 361/91; 361/18; 361/89
[58] Field of Search ...................... 361/91, 111, 18, 88, 361/89; 317/31

[56] References Cited

U.S. PATENT DOCUMENTS

| | | | |
|---|---|---|---|
| 3,944,889 | 3/1976 | Conway | 317/31 |
| 4,343,010 | 8/1982 | Denny et al. | 346/110 R |
| 4,605,981 | 8/1986 | Huvet et al. | 361/91 |
| 4,758,920 | 7/1988 | McCartney | 361/119 |
| 4,796,283 | 1/1989 | Brunner et al. | 377/6 |
| 4,879,623 | 11/1989 | Baumgartner et al. | 361/33 |
| 4,998,098 | 3/1991 | Schweitzer, III | 340/662 |

Primary Examiner—Steven L. Stephan
Assistant Examiner—D. R. Haszko
Attorney, Agent, or Firm—Banner, Birch, McKie & Beckett

[57] ABSTRACT

A power supply abnormality detection system of the present invention includes a low-frequency power amplifier circuit equipped with a built-in overvoltage protection circuit for detecting a voltage exceeding, for example, a reference power supply voltage. In accordance with the presence or absence of an overvoltage detected by the overvoltage protection circuit, a detection signal emerges from a detection output terminal provided outside the low-frequency power amplifier circuit. In accordance with that emerging detection signal, a counting circuit counts an overvoltage detection amount as pulses and, when the number of pulses exceeds a predetermined reference number, a power supply line relay section is operated so as to interrupt the supply of that overvoltage and an abnormality alarm device informs the generation of the overvoltage to an outside.

7 Claims, 3 Drawing Sheets

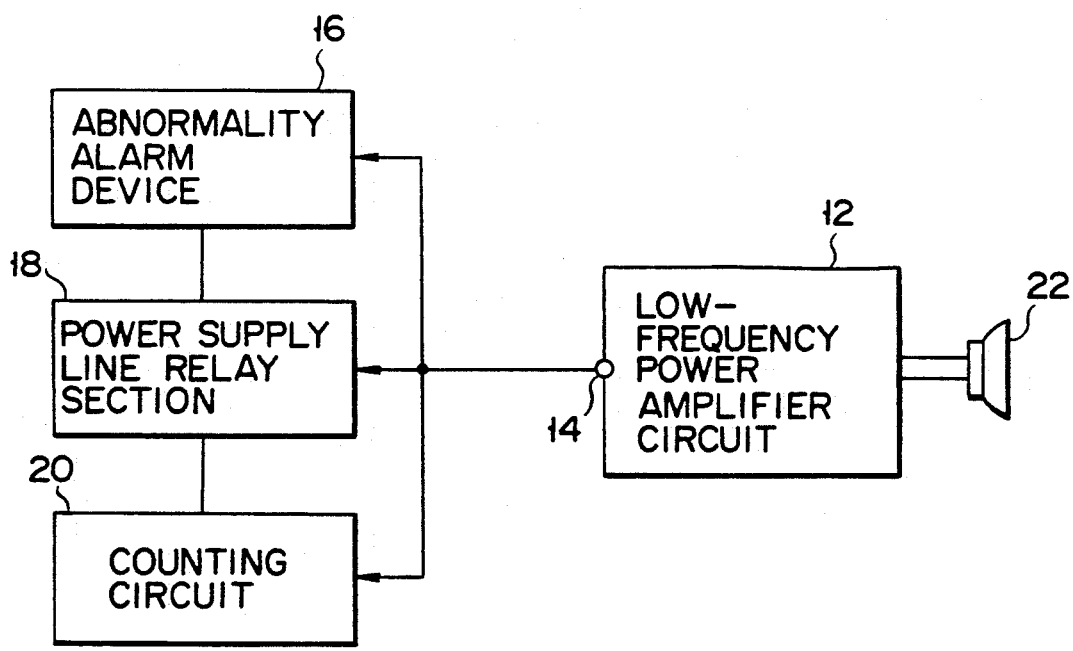
F I G. 2

EXTERNALLY DISCERNIBLE POWER SUPPLY ABNORMALITY DETECTION SYSTEM

BACKGROUND OF THE INVENTION

1. Field of the Invention

The present invention relates to a system for detecting an abnormal state of a power supply and, in particular, to a system for detecting an abnormal state of a power supply, in an externally discernible fashion, which can be applied to an automobile's stereo set or the like with a battery, in particular, used as a power supply.

2. Description of the Related Art

Generally, an overvoltage protection circuit is built in a low-frequency power amplifier so as to protect the latter from being destroyed by a power supply's surge or overvoltage or from being degenerated in its characteristic. In the case where a stereo set is used as an attachment on automobiles in particular, such a protection device is essential to a recent low-frequency amplifier because there is a high possibility that overvoltage or various surges will be supplied to that power supply.

FIG. 1 shows a conventional overvoltage protection circuit as one form of a monolithic IC element on an automobile.

In FIG. 1, a resistor R1, zener diodes Z1, Z2, Z3 and Z4 and resistor R2 are series connected across a power supply $V_{CC}$ line and a ground GND line. Resistors R3 and R4 are connected at one end to the power supply $V_{CC}$ and at the other end to the emitters of PNP transistors Q1 and Q2. The transistor Q1 has its base connected to the base of the transistor Q2 and to its own collector to function as a diode. NPN transistor Q3 has its collector connected to the collector of the transistor Q1 and its base to a junction of the zener diode Z4 and resistor R2 and its emitter connected to the ground GND line. A bias circuit 10 is connected through a resistor R5 to the collector of the transistor Q2.

In the overvoltage protection circuit thus arranged, a voltage on the power supply line is normally monitored by stack voltages ($V_{Z1}$, $V_{Z2}$, $V_{Z3}$ and $V_{Z4}$) corresponding to zener voltages $V_{Z1}$, $V_{Z2}$, $V_{Z3}$ and $V_{Z4}$ on the zener diodes Z1, Z2, Z3 and Z4. If any overvoltage or surge satisfying the following condition "Power Supply Voltage: $V_{CC} > (V_{Z1} + V_{Z2} + V_{Z3} + V_{Z4})$" is applied to the power supply line, then the NPN transistor Q3 is turned ON and the PNP transistor Q constituting part of a constant current mirror circuit is turned ON, causing current to flow through the resistor R5 so that the bias circuit is blocked. By doing so, it is possible to prevent a low-frequency power amplifier, such as an audio power IC element, from being destroyed or degenerated in its characteristic.

However, the overvoltage protection circuit cannot protect the low-frequency amplifier from all the surge applied to the power supply line. That is, the surge, upon being applied to the associated circuit to a level exceeding a net level of the overvoltage protection circuit, will cause the destruction of the low-frequency amplifier or the degeneration of its characteristic.

In order to increase the net value of the overvoltage protection circuit, it will be necessary to raise the withstand voltage of, for example, the aforementioned audio power IC element. To this end, the IC chip size becomes greater, resulting in a high cost.

If a power IC element on the market is being degenerated in its characteristic or destroyed as already set forth above, it will be difficult to evaluate its real cause or its real adverse situations. That is, it is not possible to externally evaluate any overvoltage on the power line and an associated circuit's abnormal or off-normal state caused by the application of an abnormal voltage. It is, therefore, not possible to clearly solve such a problem as caused by a low-frequency amplifier in a continuous abnormal state, such as a defective power IC element sometimes encountered as an off-the-shelf product, and it becomes very difficult to find out that cause of such abnormality on the associated circuit or element.

SUMMARY OF THE INVENTION

It is, therefore, the object of the present invention to provide a system which can externally detect an abnormal state of an associated circuit or element as caused by overvoltage on a power supply line as well as by the supply of an abnormal voltage.

According to the present invention, there is provided a power supply abnormality detection system comprising an overvoltage detection unit for detecting a supply of a voltage exceeding a reference voltage to be supplied from a power supply, an output section for delivering a detection signal to an outside of the overvoltage detection unit in accordance with a presence or absence of an overvoltage detected by the overvoltage detection unit, counting circuit for counting an overvoltage detection amount as pulses in accordance with the overvoltage signal delivered from the output section, and a unit for expressing a generation of the overvoltage in accordance with the overvoltage detection amount counted by the counting circuit as pulses.

According to another aspect of the present invention, there is provided a power supply abnormality detection circuit comprising power supply unit for supplying a predetermined power supply voltage, voltage monitoring circuit for monitoring the voltage which is supplied from the power supply means overvoltage detection circuit for detecting a voltage exceeding the voltage monitored by the voltage monitoring circuit, an output section for delivering a detection signal to an outside of the overvoltage detection circuit in accordance with the presence or absence of that overvoltage detected by the overvoltage detection circuit, counting circuit for counting an overvoltage detection amount as pulses in accordance with the detection signal delivered from the output section, determining circuit for determining that the overvoltage has been generated in accordance with the overvoltage detection amount counted by the counting circuit as pulses, and means for cutting off a reference power supply voltage in accordance with the overvoltage determined by the determining circuit as having been generated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing a power supply abnormality detection system according to one embodiment of the present invention;

DETAILED DESCRIPTION OF THE PREFERRED EMBODIMENTS

Figure 1:
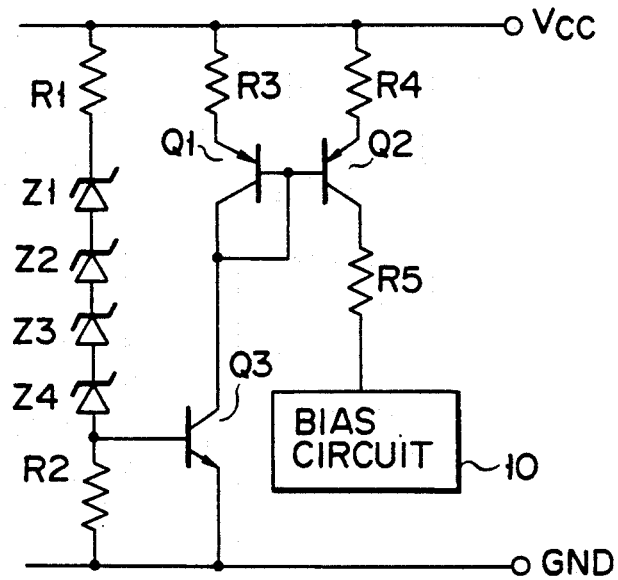
FIG. 1 is a circuit diagram showing an overvoltage protection circuit incorporated into a conventional low-frequency power amplifier.

A power supply abnormality detection system according to one embodiment of the present invention will now be explained below with respect to the accompanying drawings.

FIG. 2 shows one form of a power supply abnormality detection system of the present invention which is applied to, for example, an audio system on an automobile or vehicle. In FIG. 2, a low-frequency power amplifier circuit 12 is equipped with an overvoltage protection circuit as will be set forth below and includes an abnormality voltage detection output terminal 14 on an outer side. To the detection output terminal 14 of the amplifier circuit 12 are connected a power supply abnormality alarm device 16, a power supply line relay section 18 and a counting circuit 20, composed of a microcomputer etc., for counting the number of times an overvoltage (hereinafter referred to as an abnormal voltage) is applied to the associated circuit. A speaker 22 is connected as an output device to the low-frequency power amplifier circuit 12. Upon the application of any abnormal voltage or surge to the overvoltage protection circuit of, for example, the low-frequency power amplifier circuit in the aforementioned system, an abnormal voltage is detected on the detection output terminal 14. A detection signal emerges from the amplifier circuit 12 after being passed through the detection output terminal 14. Upon the receipt of the detection signal, the abnormality alarm device 16 sends it, as an alarm, to an outside lamp, such as a panel on an audio system on the vehicle. The counting circuit 20 detects an abnormal voltage as pulses over a given period of time and counts the number of pulses over such abnormal period of time. When the number of pulses exceeds a predetermined reference number, the power supply line relay section 18 is operated, cutting off the power supply line 18.

When the abnormal voltage is applied to the power supply, the power supply line is cut off, enabling the user to visually recognize or identify that abnormal state by the abnormality alarm device 16. The aforementioned system serves the purpose even if any one of the alarm device 16 and relay section 18 is operated.

The alarm device 16 acts as an alarm mechanism and may further include a liquid crystal, a fluorescent display tube, an LED, etc.

Figure 3:
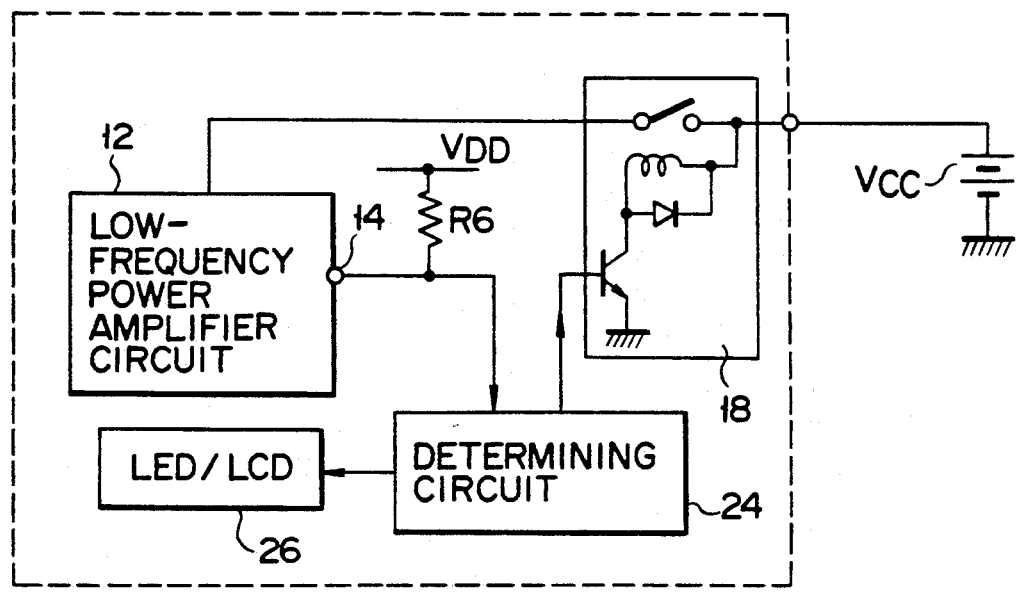
FIG. 3 is a block diagram showing a practical overvoltage protection system using the power supply abnormality detection system shown in FIG. 4.

FIG. 3 is a block diagram showing a practical circuit arrangement of a power supply abnormality detection system shown in FIG. 2.

In FIG. 3, a low-frequency power amplifier circuit 12 has a detection output terminal 14 as set forth above and is connected to a power supply line $V_{DD}$ through a resistor R6. A movable contact of a power supply line relay section 18 is connected to the amplifier circuit 12. A fixed contact of the relay section 18 is connected to a power supply $V_{CC}$. A coil unit for moving the movable contact is connected to a determining circuit 24. The determining circuit 24 is connected to the detection output terminal 14 and to an LED/LCD section 26. The determining circuit 24 acts both as a counting circuit 20 for counting the number of times the abnormal voltage (pulse) is applied and as a switching operation (power supply cutoff) determining unit. Further, the determining circuit 24 is composed of a memory, etc., and detects an abnormal voltage by comparing the kind of pulses, such as the presence or absence of giant pulses and the times of their occurrences to those reference data items which have been initially entered into the system.

In the power supply abnormality detection system, upon the application of any abnormal voltage to a power supply $V_{DD}$ it passes through the detection output terminal 14 and emerges, as a detection signal, from the amplifier circuit 12. The determining circuit 24 receives a detection signal to determine whether or not any abnormal voltage occurs. For example, a counting circuit 20 detects abnormal voltage pulses in a predetermined period of time as in the aforementioned counting circuit 20 and generates an abnormal voltage when the number of pulses at the abnormal time exceeds a predetermined reference number.

If the determining circuit 24 determines that an abnormal voltage has occurred, it delivers an output signal to an LED/LCD section 26 and to a relay section 18. Then the LED/LCD section 26 flashes on and off or repeats its display, informing this abnormal state to, for example, the user. By switching the contact of the relay section 18 the power supply is cut off, thus protecting the associated circuit from any overvoltage.

The value of the resistor R6 is determined in accordance with the operation voltage (for example, 5 V) of a microcomputer (a counting circuit section of the determining circuit 24) and can be varied in accordance with the level of the operation voltage.

The abnormal voltage (overvoltage) detection circuit will be explained below with reference to FIG. 4.

Figure 4:
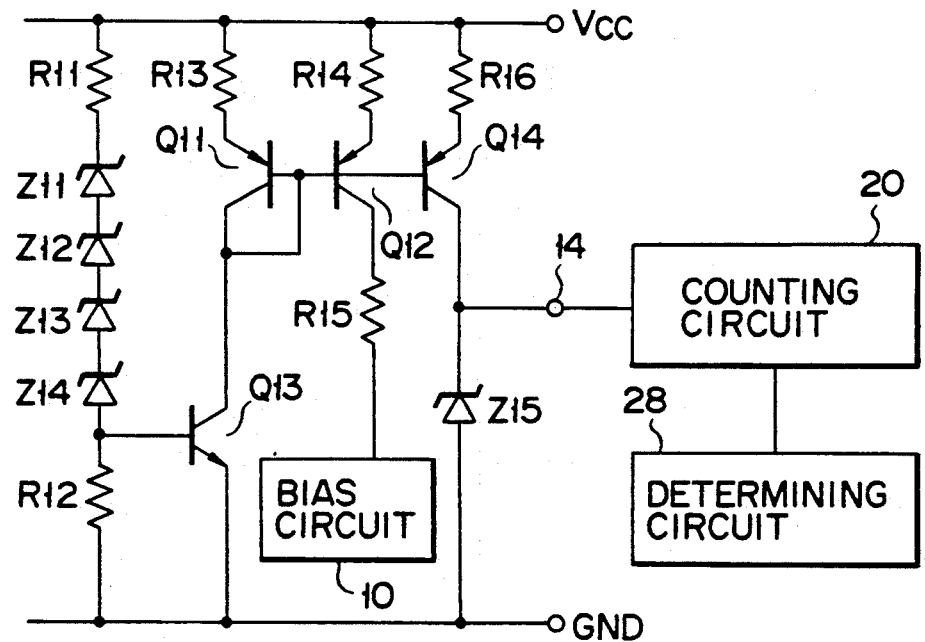
FIG. 4 shows one form of an abnormal voltage detection circuit in the power supply abnormality detection system shown in FIG. 2.

FIG. 4 shows an abnormal voltage detection circuit to which a current mirror is applied. Between a power supply $V_{CC}$ line and a ground GND line is connected a series circuit of a resistor R11, constant-voltage diodes (zener diodes Z11, Z12, Z13 and Z14) and resistor R12. Resistors R13 and R14 are connected at one end to the power supply $V_{CC}$ and at the other hand to the emitters of PNP transistors Q11 and Q12. The transistor Q11 has its base connected to the base of the transistor Q12 and to its own collector to function as a diode. The collector of the transistor Q11 is connected to the collector of a PNP transistor Q13. The transistor Q13 has its base connected to a junction of the zener diode Z14 and resistor R12 and its emitter to the ground GND line. A bias circuit 10 is connected through a resistor R15 to the collector of the transistor Q12.

The emitter of the PNP transistor Q14 is connected through a resistor R16 to the power supply VCC line.

The transistor Q14 has its base connected to the bases of the transistors Q11 and Q12 and its collector connected via a zener diode Q15 to the ground GND line. An abnormal voltage detection output terminal 14 is connected between the collector of the transistor Q14 and the zener diode Z15. The detection output terminal 14 is connected to a counting circuit 20 which is, in turn, connected to a determining circuit 28. The determining circuit 28 is composed of a memory, etc., as in the case of the determining circuit 24 and detects an abnormal voltage as pulses by comparing the kinds of pulses such as the presence or absence of giant pulses, and the number of times the pulses are applied to an associated circuit to those reference values which have initially been recorded.

In the circuit arrangement shown in FIG. 4, a voltage on the power supply $V_{CC}$ line is normally monitored by stack voltages corresponding to zener voltages $V_{Z11}$ to $V_{Z14}$ on the zener diodes Z11 to Z14, that is, $V_{Z11}+V_{Z12}+V_{Z13}+V_{Z14}$. When any voltage or surge satisfying the following condition "Power Supply Voltage: $V_{CC}>(V_{Z11}+V_{Z12}+V_{Z13}+V_{Z14})$" is applied to the power supply line, then the NPN transistor Q13 is turned ON.

According to the present invention, the NPN transistor Q12 and PNP transistor Q14 are turned ON by the turning ON of the PNP transistor Q11 constituting a portion of that constant current mirror circuit. A zener voltage $V_{Z14}$ on the zener diode Z14 emerges on the detection output terminal 14. By doing so, a low level signal emerges on the detection output terminal 14 at a normal time and a high level signal at an abnormal time.

That is, the present circuit is different from a conventional circuit in that, using a signal for cutting off the bias circuit 10, a signal is derived externally from the low-frequency power amplifier circuit upon the supply of an abnormal voltage or surge to the associated circuit. Upon receipt of a detection signal from the detection output terminal 14, the counting circuit 20 detects abnormal voltage pulses in a predetermined period of time and counts the number of pulses at the abnormal time. Whether or not an abnormal voltage occurs is determined by the determining circuit 24 according to whether or not the number of corresponding pulses exceeds a predetermined reference number. The counting circuit detects abnormal voltage pulses in the predetermined period of time and, if the number of the corresponding pulses exceed the predetermined reference number at the abnormal time, the occurrence of abnormal voltage is determined as being involved.

According to the power supply abnormality detection system of the present invention, if any abnormal voltage, for example, occurs, the corresponding pulses are counted and, if the number of such pulses exceed the predetermined number, the system automatically protects not only a low-frequency power amplifier circuit but also an apparatus equipped with the power amplifier circuit, such as an audio device on the vehicle, from any abnormal voltage. Since, according to the present invention, a continuous state of abnormality is cut off by the overvoltage protection circuit built in the existing low-frequency power amplifier circuit, the apparatus as a whole can achieve an adequate protection against the aforementioned surge and hence ensures an apparatus of high reliability.

Figure 5:
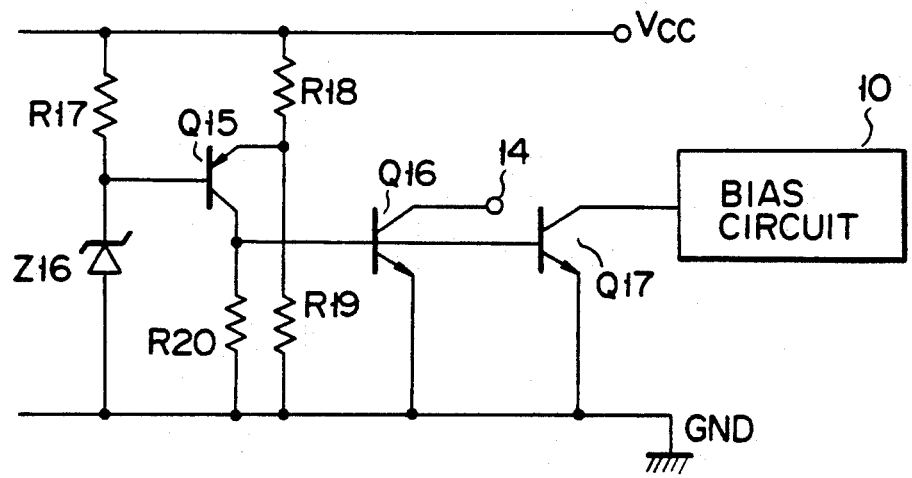
FIG. 5 shows another form of an abnormal voltage circuit in the power supply abnormality detection system shown in FIG. 2.
Figure 6:
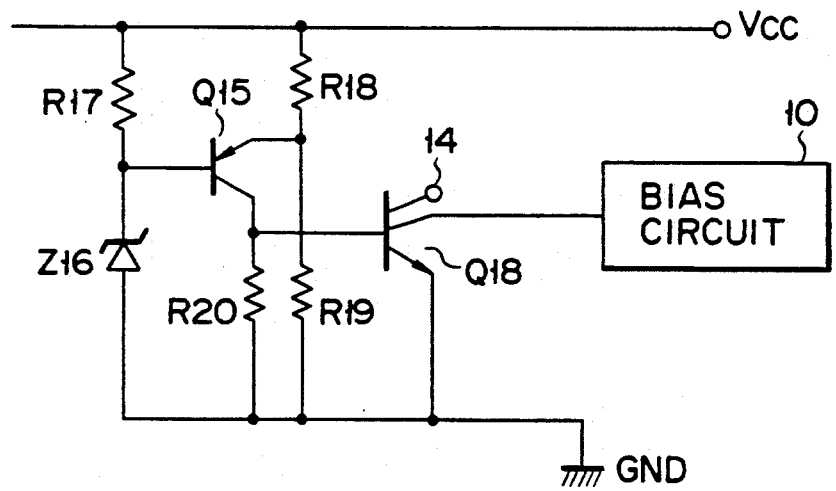
FIG. 6 shows another form of an abnormal voltage circuit in the power supply abnormality detection system shown in FIG. 2.

FIGS. 5 and 6, each, shows another form of an abnormal voltage detection circuit in the power supply abnormality detection system shown in FIG. 2 In FIGS. 5 and 6, the same reference numerals are employed to designate parts or elements corresponding to those shown in FIG. 2 to FIG. 4 and any further explanation is, therefore, omitted for brevity's sake.

In the circuit arrangement shown in FIGS. 5 and 6, a series circuit of a resistor R17 and zener diode Z16 and that of a resistors R18 and R19 are connected between a power supply $V_{CC}$ line and a ground GND line. A PNP transistor Q15 has its base connected to a junction of the resistor R17 and the zener diode Q16, its collector connected to a junction of the resistors R18 and R19 and its collector connected to the ground GND line through a resistor R20. An NPN transistor Q16 has its base connected to the collector of the transistor Q15 and its emitter connected to the ground GND line in which case the collector of the transistor Q16 acts as a detection output terminal 14 An NPN transistor Q17 has its base connected to the base of the transistor Q16, its emitter connected to the ground GND line and its collector connected to a bias circuit 10.

FIG. 6 shows an NPN transistor Q18 as a multicollector element which is provided in place of the transistor Q17 shown in FIG. 5. That is, the transistor Q18 has its base connected to the collector of a transistor Q15 and its emitter connected to a ground GND line. A first collector of the transistor Q18 is connected to a detection output terminal 14 and a second collector of the transistor is connected to a bias circuit 10 for cutting off an IC element.

In such a resistor division type abnormal voltage detection circuit, the transistor Q17 has the function of cutting off the bias circuit 10 which is connected to the abnormal voltage detection circuit. Upon receipt of an abnormal voltage satisfying an equation $$V_{CC}>[V_Z+V_B(Q15)]\times(R18+R19),$$

the transistor Q15 is turned ON and a second abnormal voltage detection circuit is operated. When this is done, the collector of the transistor Q16 or Q17 or the collector of the transistor Q18 serves as a surge or abnormal voltage detection terminal 14.

Additional advantages and modifications will readily occur to those skilled in the art. Therefore, the invention in its broader aspects is not limited to the specific details, and representative devices, shown and described herein. Accordingly, various modifications may by without departing from the spirit or scope of the general inventive concept as defined by the appended claims and their equivalents.

What is claimed is:

1. A power supply system for a device comprising:
   a power supply;
   a power amplifier;
   a power amplifier for use with said device and connected to said power supply;
   a bias circuit for generating a bias current for said power amplifier;
   a voltage monitoring circuit for monitoring a voltage of said power supply;
   an overvoltage protection circuit for cutting off said bias current of said bias circuit and outputting overvoltage detection signals in response to the monitored voltage of said power supply exceeding a predetermined voltage;
   a counting circuit receiving the overvoltage detection signals and generating a count corresponding to the number of overvoltage detection signals output by said overvoltage protection circuit;

determining means for determining an overvoltage condition and outputting an overvoltage condition signal in response to the count of said counting circuit exceeding a predetermined count in a predetermined time period; and a switch responsive to the overvoltage condition signal for disconnecting said power supply from said power amplifier and said device.

2. The power supply system of claim 1 wherein the overvoltage detection signals comprise pulse signals, said counting circuit receiving the pulse signals and generating a count corresponding to the number of pulse signals output by said overvoltage protection circuit.

3. The power supply system of claim 1 further comprising:

indicating means coupled to said determining means for indicating if the overvoltage condition exists.

4. The power supply system of claim 3 wherein said indicating means comprises visual indicating means for visually indicating if the overvoltage condition exists.

5. The power supply system of claim 1 wherein said power amplifier comprises a low frequency power amplifier.

6. A power supply system for a device comprising:

a power supply;

a power amplifier; a power amplifier for use with said device and connected to said power supply;

a bias circuit for generating a bias current for said power amplifier;

a voltage monitoring circuit for monitoring a voltage of said power supply;

an overvoltage protection circuit for cutting off said bias current of said bias circuit and outputting overvoltage detection signals in response to the monitored voltage of said power supply exceeding a predetermined voltage;

a counting circuit receiving the overvoltage detection signals and generating a count corresponding to the number of overvoltage detection signals output by said overvoltage protection circuit;

determining means for determining an overvoltage condition and outputting an overvoltage condition signal in response to the count of said counting circuit exceeding a predetermined count in a predetermined time period; and a switch responsive to the overvoltage condition signal for disconnecting said power supply from said power amplifier and said device, wherein said voltage monitoring circuit and said overvoltage protection circuit comprise:

a first resistor having a first terminal coupled to a power supply line;

a zener diode having a cathode coupled to a second terminal of said first resistor and an anode coupled to a ground line;

a second resistor having a first terminal coupled to said power supply line;

a third resistor having a first terminal coupled to a second terminal of said second resistor and a second terminal coupled to said ground line;

a fourth resistor having a first terminal coupled to said ground line;

a first bipolar transistor having a base coupled to a point between the cathode of said zener diode and the second terminal of said first resistor, an emitter coupled to a point between the second terminal of said second resistor and the first terminal of said third resistor, and a collector coupled to a second terminal of said fourth resistor;

a second bipolar transistor having a base connected to a point between the collector of said first bipolar transistor, an emitter coupled to said ground line, and a collector for outputting the overvoltage detection signals.

7. A power supply system for a device comprising:

a power supply;

a power amplifier; a power amplifier for use with said device and connected to said power supply;

a bias circuit for generating a bias current for said power amplifier;

a voltage monitoring circuit for monitoring a voltage of said power supply;

an overvoltage protection circuit for cutting off said bias current of said bias circuit and outputting overvoltage detection signals in response to the monitored voltage of said power supply exceeding a predetermined voltage;

a counting circuit receiving the overvoltage detection signals and generating a count corresponding to the number of overvoltage detection signals output by said overvoltage protection circuit;

determining means for determining an overvoltage condition and outputting an overvoltage condition signal in response to the count of said counting circuit exceeding a predetermined count in a predetermined time period; and a switch responsive to the overvoltage condition signal for disconnecting said power supply from said power amplifier and said device, wherein said voltage monitoring circuit and said overvoltage protection circuit comprise:

a first resistor having a first terminal coupled to a power supply line;

a zener diode having a cathode coupled to a second terminal of said first resistor and an anode coupled to a ground line;

a second resistor having a first terminal coupled to said power supply line;

a third resistor having a first terminal coupled to a second terminal of said second resistor and a second terminal coupled to said ground line;

a fourth resistor having a first terminal coupled to said ground line;

a first bipolar transistor having a base coupled to a point between the cathode of said zener diode and the second terminal of said first resistor, an emitter coupled to a point between the second terminal of said second resistor and the first terminal of said third resistor, and a collector coupled to a second terminal of said fourth resistor;

a second bipolar transistor having a base connected to a point between the collector of said first bipolar and the second terminal of said fourth resistor, an emitter coupled to said ground line, a first collector coupled to said bias circuit, and a second collector for outputting the overvoltage detection signals.

* * * * *

UNITED STATES PATENT AND TRADEMARK OFFICE
CERTIFICATE OF CORRECTION

PATENT NO. : 5,166,854  
DATED : November 24, 1992  
INVENTOR(S) : Toshiyuki MORISHIGE Page 1 of 2

It is certified that error appears in the above-indentified patent and that said Letters Patent is hereby corrected as shown below:

On the cover page, after "U.S. Patent Documents" in [56] References Cited, add

--- 3,225,257    12/65    Fegley    317 33 ---

On the cover page, after "4,998,098    3/1991 Schweitzer III... 340/662" in [56] References Cited, add -- Foreign Patent Documents 2161 001    6/73    Germany Other Publications E.D.N. Electrical Design News, Vol 26, No. 1 (January 1981), pp. 87-88, "Over/Under-voltage Protection Circuit Provides 2-channel versatility" --

Column 6, claim 1, delete line 3.  
Column 7, claim 6, line 3, delete "a power amplifier;"

UNITED STATES PATENT AND TRADEMARK OFFICE
CERTIFICATE OF CORRECTION

PATENT NO. : 5,166,854
DATED : November 24, 1992
INVENTOR(S) : Toshiyuki Morishige It is certified that error appears in the above-indentified patent and that said Letters Patent is hereby corrected as shown below:

Column 8, claim 7, line 3, delete "a power amplifier:"

Signed and Sealed this

Twenty-second Day of March, 1994

Attest:

BRUCE LEHMAN

*Attesting Officer*      *Commissioner of Patents and Trademarks*